United States Patent
Collier et al.

(10) Patent No.: US 8,533,142 B2
(45) Date of Patent: Sep. 10, 2013

(54) PRODUCT LIFECYCLE MANAGEMENT SYSTEM USING PARTIAL SOLVE

(75) Inventors: Wayne B. Collier, New York, NY (US); Thomas Moeller, Weilerswist (DE); Milind Nanal, Pune (IN); Sanjay Kulkarni, Canton, MI (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 240 days.

(21) Appl. No.: 13/031,767

(22) Filed: Feb. 22, 2011

(65) Prior Publication Data
US 2012/0215730 A1    Aug. 23, 2012

(51) Int. Cl.
*G06F 5/00* (2006.01)
*G06N 5/00* (2006.01)

(52) U.S. Cl.
USPC .............................. 706/47; 716/113; 707/804

(58) Field of Classification Search
USPC .......................................................... 706/47
See application file for complete search history.

(56) References Cited

U.S. PATENT DOCUMENTS

| | | | |
|---|---|---|---|
| 6,381,616 | B1 | 4/2002 | Larson et al. |
| 6,625,616 | B1 | 9/2003 | Dragon et al. |
| 2002/0143754 | A1 | 10/2002 | Paulley et al. |
| 2004/0044662 | A1 | 3/2004 | Ganesan et al. |
| 2006/0052896 | A1 | 3/2006 | Woehler |
| 2007/0005612 | A1 | 1/2007 | Goh et al. |
| 2007/0276808 | A1 | 11/2007 | McGushion |
| 2008/0010328 | A1 | 1/2008 | Moeller et al. |
| 2008/0104032 | A1* | 5/2008 | Sarkar ............................... 707/3 |
| 2010/0121869 | A1* | 5/2010 | Biannic ........................ 707/759 |

OTHER PUBLICATIONS

Vorwerk et al., "On Implicate Discovery and Query Optimization", Database Engineering and Applications Symposium, 2002, Proceedings. International, Jul. 17-19, 2002, 10 pages.
Jarke et al., "Query Optimization in Database Systems", Computing Surveys, vol. 16, No. 2, Jun. 1984, pp. 1-152.
PCT, "PCT International Search Report", PCT Article 18 and Rules 43 and 44, International Application No. PCT/US2007/015666, Filed Jul. 6, 2007, 13 pages.
International Search Report dated Jan. 30, 2013 in connection with International Patent Application No. PCT/US2012/025405, 4 pages.
International Written Opinion of International Searching Authority dated Jan. 30, 2013 in connection with International Patent Application No. PCT/US2012/025405, 7 pages.
Vorwerk, et al.; "On Implicate Discovery and Query Optimization"; Database Engineering and Applications Symposium, Piscataway, NJ, IEEE, Jul. 17-19, 2002, 10 pages.

* cited by examiner

*Primary Examiner* — Kakali Chaki
*Assistant Examiner* — Kalpana Bharadwaj

(57) ABSTRACT

Systems, methods, and computer readable mediums. A method includes receiving an input expression including a set of options joined using logical operators. The method includes converting the input expression into an order string. The method includes receiving at least one rule that defines relationships between variants of different option families and receiving a configuration expression that specifies values for some but not all variants of the option families. The method includes producing a conjunctive normal form (CNF) order expression corresponding to the order string, at least one rule, and configuration expression. The method includes performing a partial solve of the order expression, the partial solve producing a result set that describes all possible configurations that correspond to the configuration expression.

18 Claims, 3 Drawing Sheets

PRODUCT LIFECYCLE MANAGEMENT SYSTEM USING PARTIAL SOLVE

CROSS-REFERENCE TO OTHER APPLICATION

The present disclosure includes some subject matter in common with commonly-assigned, co-pending U.S. patent application Ser. No. 11/482,534, filed Jul. 7, 2006, which is hereby incorporated by reference. That application is published as United States Patent Publication 2008/0010328.

TECHNICAL FIELD

The present disclosure is directed, in general, to systems and methods for use in computer-aided design, manufacturing, engineering, prototype/test, maintenance, modeling, visualization, and product lifecycle management (individually and collectively, "PLM systems"), and other systems.

BACKGROUND OF THE DISCLOSURE

Many manufactured products are first designed and modeled in CAD or PLM systems, and PLM systems are used by manufacturers, retailers, customers, and other users to manage the design, use, maintenance, and disposal of various products. Improved systems are desirable.

SUMMARY OF THE DISCLOSURE

Various embodiments include systems, computer-implemented methods, and computer readable mediums. A method includes receiving an input expression including a set of options joined using logical operators. The method includes converting the input expression into an order string. The method includes receiving at least one rule that defines relationships between variants of different option families and receiving a configuration expression that specifies values for some but not all variants of the option families. The method includes producing a conjunctive normal form (CNF) order expression corresponding to the order string, at least one rule, and configuration expression. The method includes performing a partial solve of the order expression, the partial solve producing a result set that describes all possible configurations that correspond to the configuration expression.

Other embodiments include a data processing system comprising a processor and an accessible memory, where the data processing system is particularly configured to perform processes as described herein. This data processing system can be a single data processing system, or multiple data processing systems acting together. Other embodiments include a non-transitory computer-readable medium encoded with computer-executable instructions that, when executed, cause a data processing system to perform processes as described herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
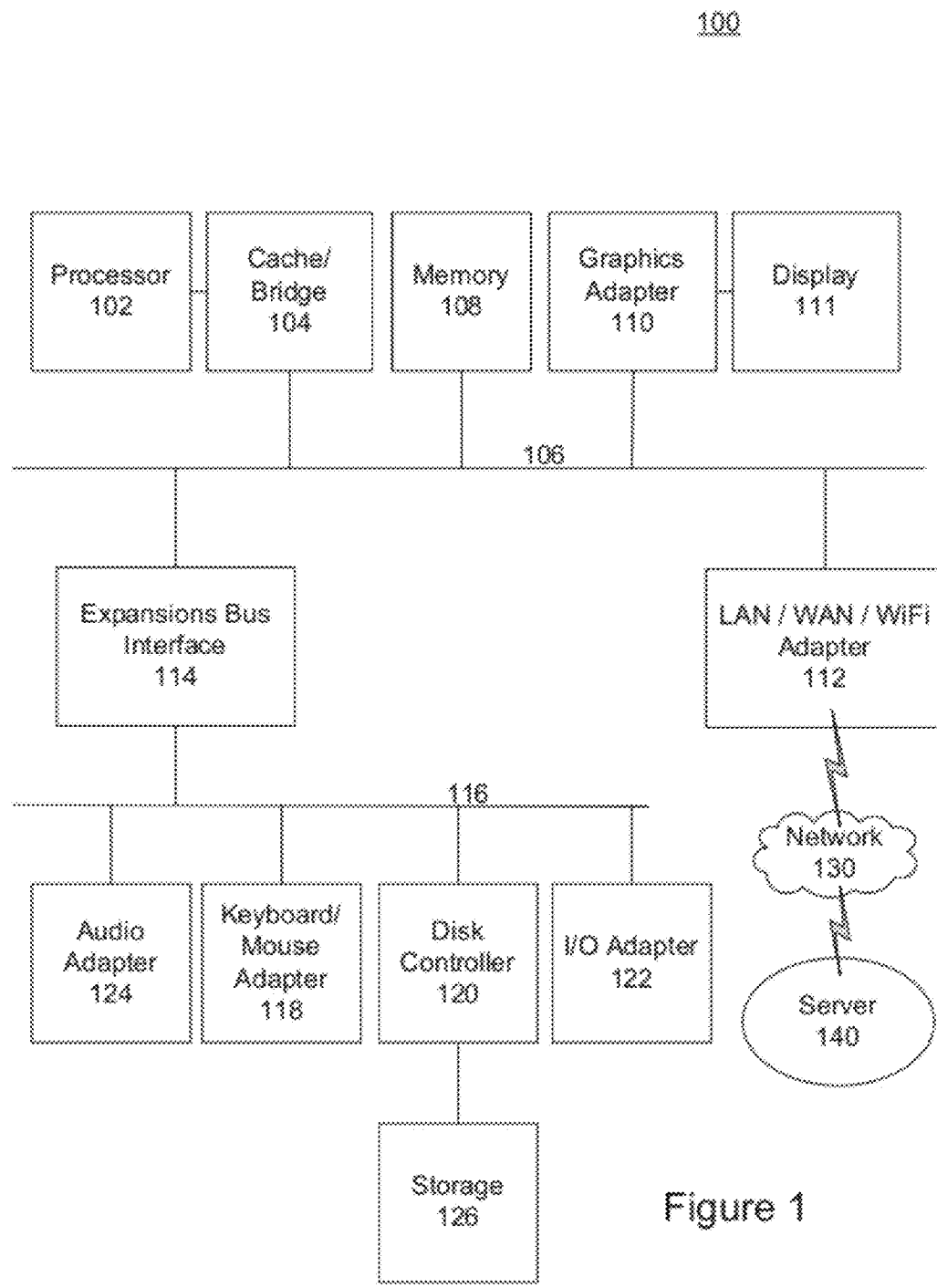
FIG. 1 depicts a block diagram of a data processing system in which an embodiment can be implemented in accordance with disclosed embodiments.
Figure 2:
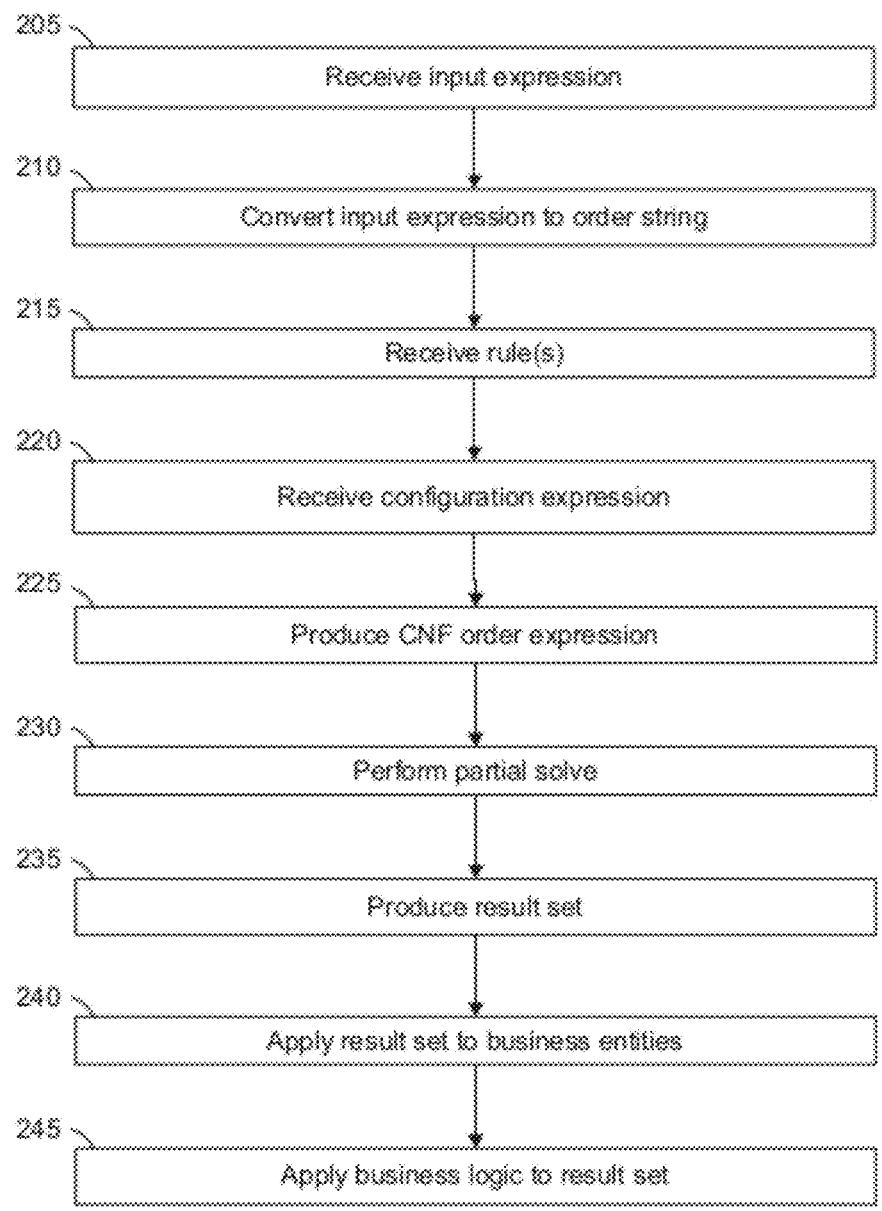
FIG. 2 depicts a flowchart of a process in accordance with disclosed embodiments.
Figure 3:
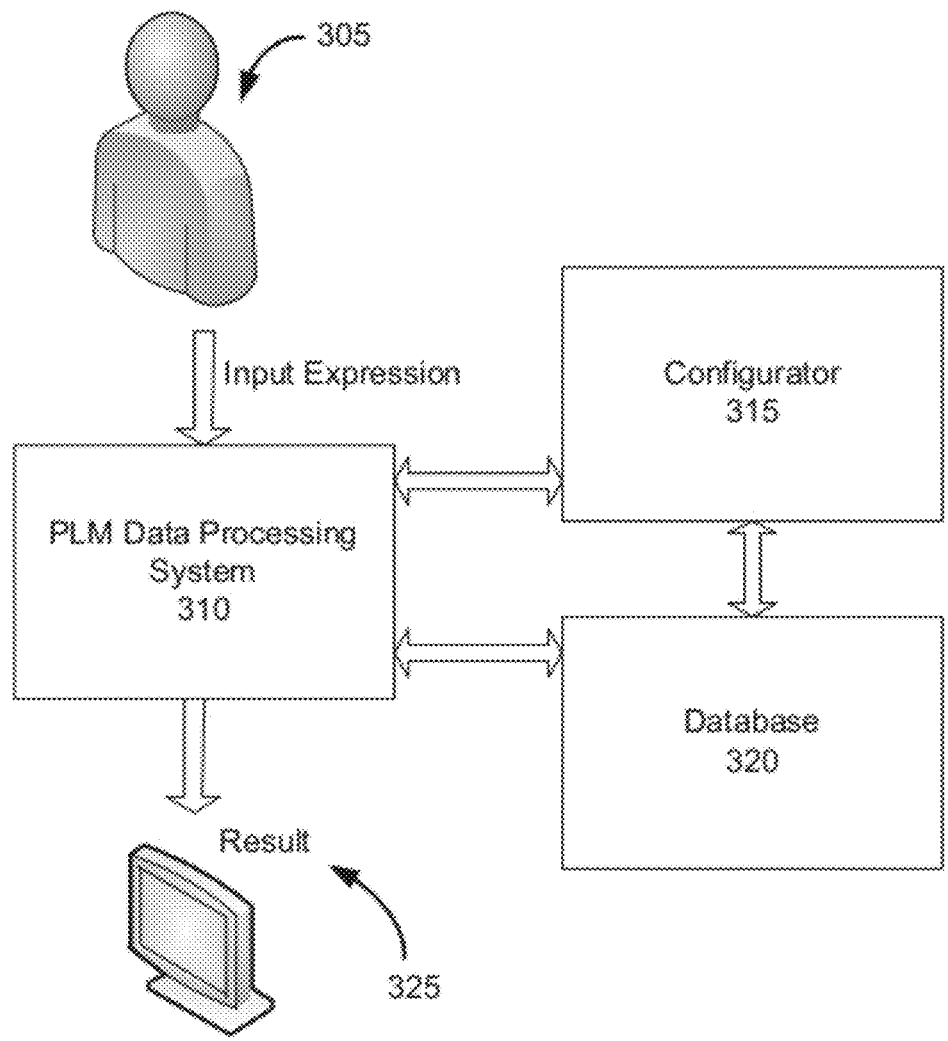
FIG. 3 depicts a simplified block diagram of some of the major elements of an exemplary implementation in accordance with disclosed embodiments.

FIGS. 1-3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Evaluating Boolean variant conditions in the application logic layer is a significant road block for performance improvements in conventional systems. This is caused by the ratio between configured and un-configured objects, which is often less than 0.1%. Lower ratios increase the overhead when loading and evaluating objects that don't end up in the result set. In addition a memory problem often arises from loading the enormous number of objects.

Disclosed embodiments provide enhanced functionality in PLM and other systems by allowing engineers or other users to rapidly determine all occurrences of parts, designs, functions, system modules, process operations, requirements, or other elements that could appear in any configuration together with an occurrence currently being analyzed or modified by the engineer. In other words, disclosed embodiments can be used to find all occurrences that could possibly interact with or interfere with the occurrence being analyzed or modified by the engineer.

Following are short definitions of the usual meanings of some of the technical terms which are used in the present application. (However, those of ordinary skill will recognize whether the context requires a different meaning.) Additional definitions can be found in the standard technical dictionaries and journals.

A "literal" refers to a Boolean expression that does not contain any sub-expression. A literal defines expression about a single variant feature; e.g., DIAMETER=589.2 mm, or WIDTH>=185 mm. A product term is a series of literals related by a logical AND operator, and a sum term is a series of literals related by a logical OR operator.

Disjunctive Normal Form (DNF) refers to a Boolean expression that combines one or more Product Terms with the logical OR operator, therefore often referred to as "Sum of Products (SOP)". For example, the DNF of "(a OR b) AND c" is "(a AND c) OR (b AND c)". Sum of Products and Disjunctive Normal Form may be used interchangeably herein.

Conjunctive Normal Form (CNF) is a logical formula that consists of a conjunction (AND) of disjunctions (OR) of terms where no disjunction contains a conjunction. For example, the CNF of "(a AND b) OR c" is "(a OR c) AND (b OR c)".

An implicant is an implied condition. A product term T of an expression E is called "implicant of E" if "E=True" can be deducted from "T=True". That is, T is implicant of E if you can say that E is satisfied when T is satisfied, although E may have additional conditions to become true.

PI is a Prime Implicant of expression E if deletion of any literal term from PI creates a Product Term that is not an Implicant of E. In other words, the information in PI cannot be reduced any more without losing the Implicant status. Prime Implicants may have overlap; i.e. two Prime Implicants may together contain the same information as a third Prime Implicants contains.

EPI is an Essential Prime Implicant of expression E if it contains information that is not contained in any combination of other Prime Implicants. In other words, the information in EPI is unique and is not contained in any other Prime Implicant or combination of Prime Implicants. Minimized expression forms must contain all Essential Prime Implicants.

For a product managed by a PLM system, a variant condition defines what components and subsystems can be configured in combination to create specific product variants. The system can use both simple and complex logical expressions to indicate that a specific component (e.g., a particular model of a particular brand) should be configured in the product variant. The use of variant conditions on product content allows for very efficiently representing a practically unlimited range of product variation. Conventional PLM systems suffer from poor to very poor configuration performance when solving a variable product for a given set variant criteria.

A Bill of Materials (BOM) can refer to a data set that describes a product or assembly, including all possible conditions, variants, options, and the rules that govern combinations of these. A BOM can refer to a fully-configured product, to a specific configuration, or to a partially-configured product, and can include information related to business entities or other information.

The term "partial solve", as used herein with respect to disclosed embodiments, describes a lookup of data (a "solve") using criteria that don't specify a value for all variants, and/or specifies multiple values for the same variant. A partial solve returns results describing an overlay of multiple product variants ("150% solve"). While most production PLM or BOM systems are optimized to execute "100%" solves, meaning a single fully-configured solution where all variants are specified, a partial solve often provides more useful output. For an input configuration expression, a partial solve returns all usage statements that can appear together with the input expression in the result set of any order.

FIG. 1 depicts a block diagram of a data processing system in which an embodiment can be implemented, for example as a CAD or PLM system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also ma be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

As used herein, "receiving" can include loading from storage, receiving from another system such as over a network or otherwise, receiving via an interaction with a user, or otherwise. The "system" in the processes described herein, can include one or more data processing systems, such as data processing system 100 or otherwise, that are particularly configured to perform the processes described, and can include data processing systems implemented as CAD or PLM systems.

Disclosed embodiments include PLM systems and methods for performing a partial solve on data, such as PLM product data, to produce expressions that can appear together with the input expression in the result set of any order.

For example, consider a Product P that has 3 option families with the following variability:

[P]X={X1,X2,X3}

[P]Y={Y1,Y2,Y3}

[P]Z={Z1,Z2,Z3}

That is, in product P, option X can be variant X1, X2, or X3, option Y can be variant Y1, Y2, or Y3, and option Z can be variant Z1, Z2, or Z3.

Assume further that a configuration rule $R_i$ associated with Product P disallows a combination of Z1 and Y2. The exemplary test cases discussed below illustrates use cases to solve for various configuration expressions C. The disclosed processes develop an expression expansion that is suitable for solving. The expanded configuration expression is built, in this example, using the following intermediate expression I:

| I = | (C) | | |
|---|---|---|---|
| | & ([P]X = X1 | \| [P]X = X2 | [P]X = X3) |
| | & ([P]Y = Y1 | \| [P]Y = Y2 | [P]Y = Y3) |
| | & ([P]Z = Z1 | \| [P]Z = Z2 | [P]Z = Z3) |
| | & (NOT $R_i$) | | |

Applying rule Ri, this expression expands to:

| I = | (C) | | |
|---|---|---|---|
| | & ([P]X = X1 | \| [P]X = X2 | [P]X = X3) |
| | & ([P]Y = Y1 | \| [P]Y = Y2 | [P]Y = Y3) |
| | & ([P]Z = Z1 | \| [P]Z = Z2 | [P]Z = Z3) |
| | & ([P]Z != Z1 | \| [P]Y = Y2) | |

The system computes and returns the minimal CNF of I as solve expression S. To achieve repeatable results for different configurations (including those that don't optimize S or don't achieve the same level of optimization), an optimization can be applied to S.

The intermediate condition I can be built based on all or a subset of product constraints. Using a limited subset of product constraints can improve performance.

Various alternatives are discussed below. The discussion below includes the term "coprime", which is a known term in the context of integral numbers. Two numbers are coprime if their greatest common divisor is 1 (the neutral element for operator "*"). As used herein, two expressions are called coprime if the greatest common Boolean divisor is TRUE (the neutral element for the operator AND, which is also often depicted as "*"). Two sets of expressions {S1} and {S2} are coprime if every member of {S1} is coprime to every member of {S2}. In simple words, Boolean expressions are coprime if they do not share a common variant option variable. If two expressions did share a common variant option variable, that variant option variable would be a common Boolean operator.

For example, given a variability of FUEL:={89, 93}, the two expressions "FUEL>89" and "FUEL<93" are coprime. If the variability is extended to include "91", the expressions are no longer coprime and "FUEL=91" is a common divisor. The same is true for "FUEL!=89" and "FUEL!=93".

Given two Boolean functions F and D, an algebraic division returns two Boolean functions Q and R such that $F = Q*D + R$; where Q!=FALSE and Q and D don't share any literals.

A Boolean division is identical to an algebraic division, except that Q and D can have common literals. Here, D is called a Boolean divisor.

With this, the system or user can define the following sets of product constraints for a given configuration expression C.

| | |
|---|---|
| $\{R_{Min}\}$ | Empty |
| $\{R_{Low}\}$ | Builds on $\{R_{Max}\}$ and removes rules $R_j$ that are coprime to C → C is coprime to $\{R_{Max} - R_{Low}\}$. |
| $\{R_{High}\}$ | Builds on $\{R_{Min}\}$ and adds rules $R_j$ that are not coprime to $\{R_{High}\}$, until no more matching rules can be found → $\{R_{High}\}$ is coprime to $\{R_{Max} - R_{High}\}$ → C is coprime to $\{R_{Max} - R_{High}\}$. |
| $\{R_{Max}\}$ | Full set of rules $R_j$, independent of C. |

The use of $I(R_{Min})$ allows results to include conditions that are mutually exclusive to C according to one or more product constraints. $I(R_{Low})$ reduces but does not eliminate this risk.

The use of $I(R_{High})$ prevents objects from being included in the rule set that are mutually exclusive with C. However, it may still return results that violate other product constraints.

However, $I(R_{Max})$ allows reliable solves.

In practice $R_{High}$ and $R_{Max}$ are of similar size. The effort to compute $R_{High}$ scales with $n^2$. The effort to compute $R_{Max}$ is significantly less than computing $R_{High}$, particularly when rules $R_j$ are stored in optimized CNS. In addition, this effort is a one-time effort since $R_{Max}$ can be used for every solve.

Therefore, various embodiments use the full set of rules $R_{Max}$. Consider the following examples:

EXAMPLE 1

| C = | ([P]X = X1 & | [P]Z < Z2 & | [P]Y != Y1) |
|---|---|---|---|
| S = | ([P]X = X1) | | |
| | & ([P]Y = Y3) | | |
| | & ([P]Z = Z1) | | |

EXAMPLE 2

| C = | ([P]Z < Z2 & | [P]Y != Y1) | |
|---|---|---|---|
| S = | ([P]X = X1 \| | [P]X = X2 \| | [P]X = X3) |

-continued

| | |
|---|---|
| | & ([P]Y = Y3) |
| | & ([P]Z = Z1) |

EXAMPLE 3

| C = | ([P]Z < Z2 & | [P]Y != Y1) | |
|---|---|---|---|
| S = | ([P]X = X1 \| | [P]X = X2 \| | [P]X = X3) |
| | & ([P]Z < Z2 \| | [P]Y != Y1) | |
| | & ([P]Z != Z1) \| | [P]Y != Y2) | |
| | & ([P]Y = Y1 \| | [P]Y = Y2 \| | [P]Y = Y3) |
| | & ([P]Z = Z1 \| | [P]Z = Z2 \| | [P]Z = Z3) |

Example 3 produces a solve condition S, which includes clauses with literals for multiple families, in that a single clause includes options from more than one of the X, Y, and Z "families". According to disclosed embodiments, the problem is solved as follows, still applying the exemplary configuration rule $R_i$ that disallows a combination of Z1 and Y2:

$$S = CNF_i(I)$$

$$= \sum Ti$$

The solve condition S can be split into "S1|S2| ..." until no more clauses exist that combine literals for different families. Separate solves can be executed for each. Si. The final result is the union set of all individual results.

| S = | ([P]X = X1) | | |
|---|---|---|---|
| | & ([P]Y = Y1 \| | [P]Y = Y2) \| | P[Y] = Y3) |
| | & ([P]Z != Z1) \| | [P]Y != Y2) | |
| | & ([P]Z < Z2 \| | [P]Y != Y1) \| | |
| | & ([P]Z = Z2 \| | [P]Z = Z1) | |
| → | | | |
| S1 = | ([P]Y = Y2) \| | [P]Y = Y3) | |
| | & ([P]X = X1) | | |
| | & ([P]Z = Z2) | | |
| S2 = | ([P]X = X1) | | |
| | & ([P]Y = Y3 \| | [P]Y = Y1) | |
| | & ([P]Z < Z2 \| | [P]Y != Y1) | |
| | & ([P]Z = Z2 \| | [P]Z = Z1) | |
| → | | | |
| S1 = | ([P]X = X1) | | |
| | & ([P]Y = Y2 \| | [P]Y = Y3) | |
| | & ([P]Z = Z2) | | |
| S2, 1 = | ([P]X = X1) | | |
| | & ([P]Y = Y3 \| | [P]Y = Y1) | |
| | & ([P]Z = Z1) | | |
| S2, 2 = | ([P]X = X1) | | |
| | & ([P]Y = Y3) | | |
| | & ([P]Z = Z2 \| | [P]Z = Z1) | |

It is estimated that this produces in the order of $\Pi m_i$ solve conditions $S_i$ where $m_i$ is the number of values involved in exclude rule $R_j$, such as "disallow a combination of Z1 and Y2 with m=2.

In practice the number can he significantly less than that because many conflicts disappear during processing, e.g., the left half of ([P]Z<S2|[P]Y !=Y1) degenerates to FALSE when building the solve condition $S_i$ for the left half of ([P]Z!=Z1)|[P]Y!=Y2). However, no upper bound was found lower than $\Pi m_i$.

The expression or logical conditions can he authored on business entities to describe their usage. The Boolean representation of these expressions is determined by the system and then the expressions are converted to a Conjunctive Normal Form (CNF) and then persisted in a database in the data processing system storage.

The input configuration expression (order expression) is first sent to the system to get additional restraints. The input expression along with the any determined restraints is then persisted in a temporary database table after converting it to a CNF.

The next step in the process is to perform the partial solve as described herein, for example using procedural SQL in the database memory. The partial solve can be implemented as a package as described herein, and can include a single-query solve such as that described in United States Patent Publication 2008/0010328, incorporated herein by reference.

A process as described herein, including a partial solve, can be considered as a core capability for performing overlay solves on expressions. The expressions can be used by any business entity that needs to have a variable configuration. The partial solve results can be combined with these expressions to produce a result set that contains a specific business entity such as Usage, Partitions, etc.

The processes described herein can be applied to perform special search for entities configured with a variable expression.

FIG. 2 depicts a flowchart of a process in accordance with disclosed embodiments. This non-limiting example describes a partial solve to find products that meet certain criteria, where all possible variants are not specifically defined.

The system receives an input expression (step 205). This input expression can comprise a set of options joined using logical operators. In some embodiments, the input expression is a configuration definition for a product that comprises a plurality of option families. Each option family includes a plurality of variants for a respective option for the product. The configuration definition can be PLM configuration data for a product.

An input expression, in various embodiments, is a conditional statement that can be written in format that is specific to a given product or assembly configuration module, referred to herein as a "configurator", that manages the possible configurations for the product or assembly. A user can enter an input as an "input expression string", an expression or condition statement that has options connected to other options with conjunction, disjunction or negation. The input expression is the input to the partial solve process. A configuration expression, as used herein, is the same as an input expression, and is used on usages to configure their use.

The system can convert the input expression into an order string (step 210). In this step, the input expression can be sent to the configurator and response from the configurator contains options and Boolean operators connecting them. This definition can be extracted from the configurator response and stored in a Boolean format by the system. Both expressions on Usages and Orders are thus available to the system in Boolean format and Boolean operations can be performed to achieve the desired results. The order string functions as a Boolean interpretation of the user-authored input expression string. In addition to the interpretation of the user entered expression into Boolean format, the order string can include restrictions added by the configurator and "forced on" requirements as added by the configurator.

According to some embodiments, the order string is solved to provide a list of Usages that meet the criteria of the input order. Usages or "Line Of Usage" is a concept that is used to release parts in the release repository using release conditions or expressions to restrict their use. Usages are written with engineering view and can be generic—one usage can be good for more than car or other product.

An advantage of performing the solve on the order string rather than the input expression is that the order string has been processed by the configurator. As such, the order string includes only those usages that are good for that product and that can appear together with other options or features specified in the order.

The system receives at least one rule that defines relationships between variants of different option families (step 215). In practice, there will be multiple and usually many such configuration rules. These rules can, for example, describe options of different families that are required of each other or must be exclusive of each other. Other rules can define relationships between variants of the same family or dependent relationships between variants of different families. This step can include sending a request to a configurator and receiving the rule(s) in response. Such a request can include the order string.

The system receives a configuration expression (step 220). The configuration expression specifies values for some but not all variants of the option families. Since this is the case, the expression cannot typically be fully solved, and can only be partially solved. The system can also receive additional constraints, restraints, or rules corresponding to the configuration expression. Configuration expressions are stored in the database in Boolean CNF format, and can include expressions on the Usages or Line Of Usages.

The system produces a CNF (Conjunctive Normal Form) order expression corresponding to the order string, at least one rule, and configuration expression (step 225). As part of this step, the system can first negate the order string (which is in the form of a Boolean expression) and then compute the DNF (Disjunctive Normal Form) of the negated Boolean expression. The literals of the DNF expressions are then negated to arrive at the CNF form order expression. The converted order expression in its conjunctive normal form is then stored in a database table. These processes can be performed as described above.

The system performs a partial solve of the order expression (step 230). In some embodiments, the partial solve is performed in accordance with the configuration definition and the rule(s), and produces a solve condition that describes all possible product configurations that correspond to the configuration expression. Because not all variants were defined by the configuration expression, this partial solve process produces multiple configuration clauses instead of a complete configuration solve. In some embodiments, the partial solve is performed using single query solve on a database such as that described in U.S. Patent Publication 2008/0010328, incorporated herein by reference.

The partial solve process can include producing an initial solve condition that includes Boolean clauses that correspond to more than one of the option families. It can include splitting the initial solve condition into multiple subconditions, where each subcondition includes a plurality of Boolean clauses that corresponds to only one of the option families. Finally, the partial solve process can combine the subconditions to produce the solve condition. The solve condition includes a plurality of Boolean clauses that each corresponds to only one of the option families. The solve condition can be stored in a conjunctive normal form, and can be displayed to a user.

In some cases, the solve condition provides a reduced-form expression of all product configurations, and corresponding variants, that correspond to the configuration expression. The solve condition can then be used as the basis for selecting or defining the remaining variant options, to then produce a bill of materials for a fully-configured product.

This partial solve process can identify all the configuration expressions that can appear in the same order with the input string (which itself represents the user's input expression).

The system produces a result set from the partial solve that is a set of expressions that would appear together with the input expression in the result set of any order (step 235). The result set can correspond to the solve condition described above, and can include a set of persisted configuration expressions.

The result set, in product-specific embodiments, can represent all possible product configurations that meet the input expression, even though all variants were not specified. The result set can be then used for a wide variety of applications. In some embodiments, the result set is then used on Usages (or Line Of Usages) or Partition Applications. The result set can be converted to and presented as a plurality of BOM lines that correspond to these possible product configurations.

In some embodiments, the system can then apply the result set to any business entities (Line Of Usage, Sub Usage, Partition Applications etc.) that were configured with variant conditions (step 240). This can be accomplished by performing a "join" of the result set with the business entity.

Some of the examples of business entities are as follows. A Line of Usage or Usage is a business entity that is used to release a part. For example, a user puts a part on Line of Usage and then writes configuration expressions and then releases them.

Similarly, Partition applications are used for architecture definitions. For example, a user writes configuration expressions on this business entity and then can solve for it.

Another business entity is Sub-Usage that is used to release CAD items. For example, a user authors configuration expressions that allows one to solve and view CAD based on qualifying expressions.

In some embodiments, the system can then apply additional business logic to the result set (step 245) and respective business entities can be presented to the user having appropriate attributes and their related information. That is, the partial solve process described herein is not dependent on any business entity. It is a very process with wide applicability that plugs into any business entity processing that requires this capability. A user is generally not interested in looking at list of configuration expressions such as the result set that is returned by the partial solve in step 235. In many cases, the user will instead apply these results to a business entity that has the configuration condition and that the configuration condition qualifies it against the solve results.

The result set can therefore be, or be used to produce, a set of Lines of Usages, Partition Applications, Sub-Usages, etc.

The Quine McCluskev algorithm is one technique for minimizing variant expressions, known to those of skill in the art.

FIG. 3 depicts a simplified block diagram of some of the major elements of an exemplary implementation of the processes described above. Here, a user 305 enters an input expression into a PLM data processing system, which receives it. The PLM data processing system can be implemented as one or more data processing systems 100, and in multiple-system embodiments, the data processing systems can be geographically distributed.

The PLM data processing system performs the processes described above in conjunction with a configurator 315 and a database 320. Note that, in various embodiments, the configurator 315 and database 320 are also implemented by the PLM data processing system 310, but are shown separately here for purposes of illustration.

The PLM data processing system 310 interacts with configurator 315 and database 320, and the configurator 315 likewise interacts with database 320.

The PLM data processing system 310 produces a result 325, that can be the result set described above, the Lines of Usages, Partition Applications, Sub-Usages, etc., or other implementation-specific results derived from the result set.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

Various steps of the processes described above may be omitted, repeated, or performed concurrently, sequentially, or in a different order, and the specific process flow example described above is not intended to be limited except as described by the claims below. Further, the various features of various embodiments are not necessarily exclusive to the examples described above, but may be combined in other embodiments as may be claimed below.

It is important to note that while the disclosure includes a description in the context of a fully-functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method implemented in one or more data processing systems, comprising:
    receiving an input expression including a set of options joined using logical operators;
    converting the input expression into an order string;
    receiving at least one rule that defines relationships between variants of different option families;
    receiving a configuration expression, the configuration expression specifying values for some but not all variants of the option families;
    producing a conjunctive normal form (CNF) order expression corresponding to the order string, at least one rule, and configuration expression; and
    performing a partial solve of the order expression, the partial solve producing a result set that describes all possible configurations that correspond to the configuration expression.

2. The method of claim 1, wherein the input expression is a configuration definition for a product that includes a plurality of option families, each option family including a plurality of variants for a respective option.

3. The method of claim 2, wherein the result set includes a plurality of Boolean clauses, each clause corresponding to only one of the option families.

4. The method of claim 1, wherein producing the CNF order expression includes negating a Boolean expression, computing a disjunctive normal form (DNF) expression from the negated Boolean expression, and negating literals of the DNF expression to produce the CNF order expression.

5. The method of claim 1, wherein the partial solve is performed using a single-query solve on a database.

6. The method of claim 2, wherein performing the partial solve comprises
    producing an initial solve condition that includes Boolean clauses that correspond to more than one of the option families,
    splitting the initial solve condition into multiple subconditions, each subcondition including a plurality of Boolean clauses that corresponds to only one of the option families, and
    combining the subconditions to produce the solve condition so that the solve condition includes a plurality of Boolean clauses that each corresponds to only one of the option families.

7. A data processing system comprising:
    a processor; and
    an accessible memory,
    the data processing system particularly configured to
    receive an input expression including a set of options joined using logical operators;
    convert the input expression into an order string;
    receive at least one rule that defines relationships between variants of different option families;
    receive a configuration expression, the configuration expression specifying values for some but not all variants of the option families;
    produce a conjunctive normal form (CNF) order expression corresponding to the order string, at least one rule, and configuration expression; and
    perform a partial solve of the order expression, the partial solve producing a result set that describes all possible configurations that correspond to the configuration expression.

8. The data processing system of claim 7, wherein the input expression is a configuration definition for a product that includes a plurality of option families, each option family including a plurality of variants for a respective option.

9. The data processing system of claim 8, wherein the result set includes a plurality of Boolean clauses, each clause corresponding to only one of the option families.

10. The data processing system of claim 7, wherein producing the CNF order expression includes negating a Boolean expression, computing a disjunctive normal form (DNF)

expression from the negated Boolean expression, and negating literals of the DNF expression to produce the CNF order expression.

11. The data processing system of claim 7, wherein the partial solve is performed using a single-query solve on a database.

12. The data processing system of claim 8, wherein performing the partial solve comprises producing an initial solve condition that includes Boolean clauses that correspond to more than one of the option families, splitting the initial solve condition into multiple subconditions, each subcondition including a plurality of Boolean clauses that corresponds to only one of the option families, and combining the subconditions to produce the solve condition so that the solve condition includes a plurality of Boolean clauses that each corresponds to only one of the option families.

13. A non-transitory computer-readable medium encoded with computer-executable instructions that, when executed, cause a data processing system to perform the steps of:

receiving an input expression including a set of options joined using logical operators;

converting the input expression into an order string;

receiving at least one rule that defines relationships between variants of different option families;

receiving a configuration expression, the configuration expression specifying values for some but not all variants of the option families;

producing a conjunctive normal form (CNF) order expression corresponding to the order string, at least one rule, and configuration expression; and performing a partial solve of the order expression, the partial solve producing a result set that describes all possible configurations that correspond to the configuration expression.

14. The computer-readable medium of claim 13, wherein the input expression is a configuration definition for a product that includes a plurality of option families, each option family including a plurality of variants for a respective option.

15. The computer-readable medium of claim 14, wherein the result set includes a plurality of Boolean clauses, each clause corresponding to only one of the option families.

16. The computer-readable medium of claim 13, wherein producing the CNF order expression includes negating a Boolean expression, computing a disjunctive normal form (DNF) expression from the negated Boolean expression, and negating literals of the DNF expression to produce the CNF order expression.

17. The computer-readable medium of claim 13, wherein the partial solve is performed using a single-query solve on a database.

18. The computer-readable medium of claim 14, wherein performing the partial solve comprises producing an initial solve condition that includes Boolean clauses that correspond to more than one of the option families, splitting the initial solve condition into multiple subconditions, each subcondition including a plurality of Boolean clauses that corresponds to only one of the option families, and combining the subconditions to produce the solve condition so that the solve condition includes a plurality of Boolean clauses that each corresponds to only one of the option families.

* * * * *